United States Patent [19]

Komatsuzaki et al.

[11] 4,426,065

[45] Jan. 17, 1984

[54] CONTINUOUS PROCESS FOR THE PRODUCTION OF POLYSTYRENE FOAMED ARTICLES

[75] Inventors: Nobuyuki Komatsuzaki; Masahiro Tsubone; Bon Machida, all of Koga, Japan

[73] Assignee: Sekisui Kaseihin Kogyo Kabushiki Kaisha, Nara, Japan

[21] Appl. No.: 330,823

[22] Filed: Dec. 15, 1981

[30] Foreign Application Priority Data

Dec. 27, 1980 [JP] Japan ................... 55-186618

[51] Int. Cl.$^3$ .............................................. B29D 27/00
[52] U.S. Cl. .................................... 264/45.9; 264/53; 264/321
[58] Field of Search ....................... 264/53, 321, 45.9

[56] References Cited

U.S. PATENT DOCUMENTS

| | | | |
|---|---|---|---|
| 3,789,095 | 1/1974 | Winstead | 264/53 X |
| 3,879,507 | 4/1975 | Cavanna et al. | 264/53 X |
| 3,928,182 | 8/1976 | Luthra | 264/53 X |

Primary Examiner—Philip E. Anderson
Attorney, Agent, or Firm—Armstrong, Nikaido, Marmelstein & Kubovcick

[57] ABSTRACT

This invention relates to a process for producing economically shaped article of polystyrene foam with a small wall thickness and sufficient strength by a continuous simple operation including a short forming cycle in which the sheet of polystyrene foam having a bulk density of 0.15 to 0.7 g/cm$^3$, a thickness of 0.3 to 1.0 mm, 5 to 20 cell membranes widthwise of the sheet and a draw ratio of up to 1.25 and containing 0.03 to 0.3 mole/kg of the residual gas of the blowing agent is formed by an extruder and utilized to produce the shaped article.

12 Claims, 8 Drawing Figures

CONTINUOUS PROCESS FOR THE PRODUCTION OF POLYSTYRENE FOAMED ARTICLES

BACKGROUND OF THE INVENTION

1. Field of the Invention

The present invention relates to a process for continuously producing shaped articles of polystyrene foam, and more particularly to a process for continuously producing shaped articles of polystyrene foam which have a small wall thickness, can be stacked to a small height, have sufficient strength for use and are economical.

2. Description of the Prior Art

In a process for producing shaped articles of polystyrene foam, it is known to use an extruder. This process comprises the steps of extruding a polystyrene resin composition along with a blowing agent by an extruder to obtain a foamed sheet, aging the sheet by allowing the sheet to stand usually for 2 to 3 weeks as wound up on a roll, heating the sheet to a temperature not lower than the softening point of the sheet and forming the sheet with molds. With this process, the extruding step and the forming step are entirely independent and there is the need to age the foamed sheet for a prolonged period of time between the two steps. The process is therefore unfavorable for a continuous operation and also involves problems economically. When the aging step is not performed, there arise such problems that the sheet is not shapable properly and the product undergoes dimensional variations with the lapse of time.

To overcome these problems, it has been proposed to supply an extruded sheet to a rotary vacuum mold for continuously producing shaped articles of thermoplastic resin foam (Japanese patent publication No. 37134/1973). However, this process, in which the heat of extrusion is utilized for forming, has problems in that the sheet is not fully stretchable and is not amenable to deep drawing, the shaped product obtained is low in strength, extreme difficulties are encountered in temperature control, and it is difficult to keep the speed of forming. Furthermore, the process is not applicable to sheets of large width and fails to achieve a high production efficiency due to great losses.

Accordingly it has been desired to provide a continuous production process free of the foregoing problems.

On the other hand, trays, partitioned sheets and like shaped articles of polystyrene foam useful for retailing foods including vegetables, fruits, meat, salad, etc. usually have an expansion ratio of at least 10 and a wall thickness of at least 2 mm and are tough but process the drawbacks of having a large stack height (the height of 100 trays stacked, the same as hereinafter) and necessitating a prolonged forming cycle (the period of time required for feeding a sheet to the molds and completely forming the sheet into the desired shape). Although trays of unfoamed polystyrene resin are available which have a wall thickness of about 0.3 mm and a small stack height, such a product requires a longer forming cycle and a larger amount of resin and is therefore uneconomical.

Accordingly it has been desired to provide of polystyrene foamed articles which have a small wall thickness, can be produced by a short forming cycle and are economical.

SUMMARY OF THE INVENTION

The object of the present invention, which has been accomplished to overcome the above problems, is to provide a process for producing economically shaped articles of polystyrene foam with a small wall thickness and sufficient strength by a continuous simple operation including a short forming cycle.

We have accomplished this invention based on the finding that excellent polystyrene foamed articles of small wall thickness can be produced substantially without the aging heretofore needed, with use of a sheet of polystyrene foam prepared by an extruder and containing the specific residual gas of blowing agent.

Stated more specifically, the present invention provides a process for continuously producing shaped articles of polystyrene foam characterized by extruding a polystyrene resin composition which contains 0 to 20% by weight of a rubber as a blend or copolymer component based on the polystyrene resin from the die of an extruder along with a blowing agent to prepare a foamed material, cooling the foamed material while stretching the material uniaxially or biaxially to obtain a sheet of polystyrene foam having a bulk density of 0.15 to 0.7 $g/cm^3$, a thickness of 0.3 to 1.0 mm, 5 to 20 cell membranes widthwise of the sheet and a draw ratio of up to 1.25 and containing 0.03 to 0.3 mole/kg of the residual gas of the blowing agent, and subsequently forming the resulting sheet into the desired shape with heating substantially without subjecting to aging of the sheet.

From another viewpoint, the invention further provides a process for the continuous production of polystyrene foamed articles by laminating a thermoplastic resin film to at least one surface of the sheet of polystyrene foam to prepare a composite sheet and subsequently forming the sheet into the desired shape similarly with heating.

DESCRIPTION OF THE PREFERRED EMBODIMENTS

Figure 1:
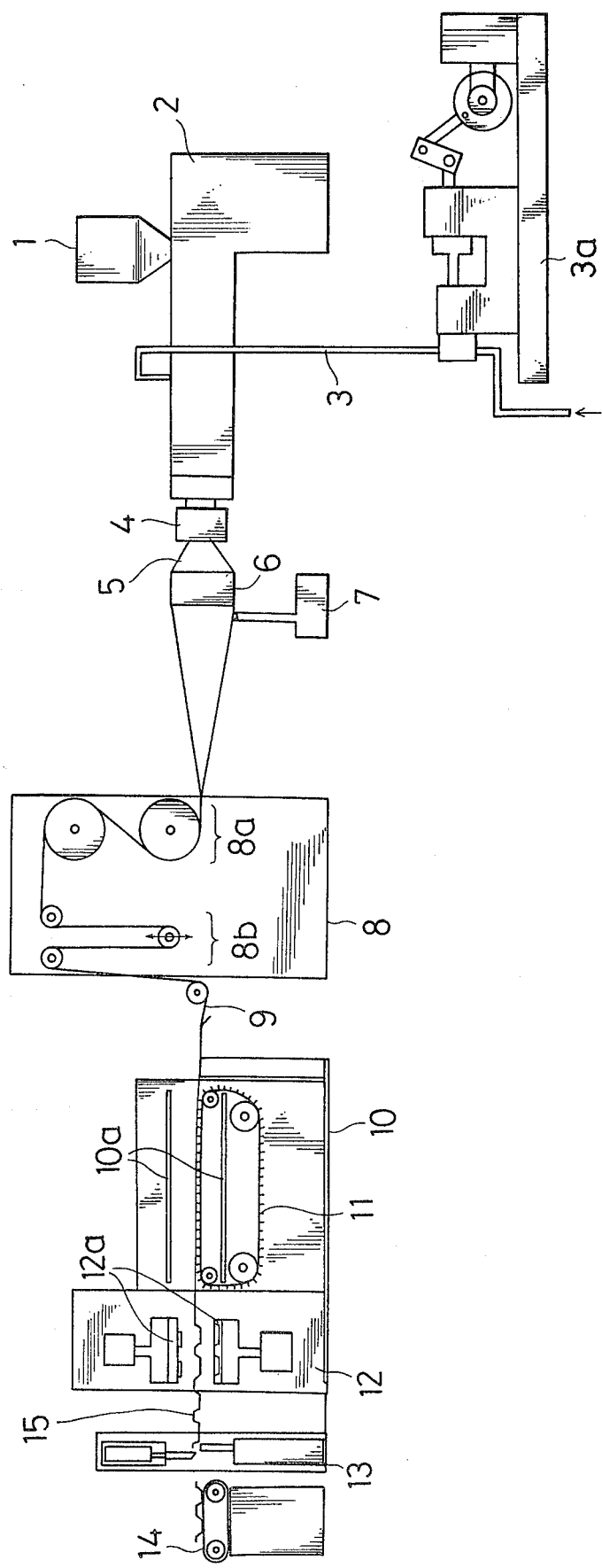
FIG. 1 is a side elevation schematically showing an apparatus useful for a continuous production process of the invention.

The polystyrene resin to be used for this invention is a polymer of, as main building block, a styrene vinyl monomer, such as styrene, methylstyrene or dimethylstyrene, or a copolymer of such a monomer and another vinyl monomer, such as acrylic acid, methacrylic acid, and ester of such an acid, acrylonitrile, acrylamide, methacrylnitrile or maleic anhydride. Of these, polystyrene is preferable. Of these polymers, usually suitable are those having a weight average molecular weight of about $5 \times 10^4$ to about $70 \times 10^4$ as determined by the Gel Permeation Chromatograph (GPC) method. The polystyrene resins which are usually used or usable for extrusion may be employed in this invention.

It is convenient to use the polystyrene resin in the particulate, granular, pelletized or like form which is usually available, or in the form of a compound consisting essentially of the resin (and containing small amouts of lubricant, stabilizer, etc.). When commercial resins are used, it is suitable to use those having a melt index of about 1.2 to about 25 (as determined according to the method of JIS K6870).

According to the invention, a polystyrene resin composition is used which comprises such a polystyrene resin and 0 to 20% by weight of a rubber as a blend or copolymer component, based on the resin. Various rubbers are useful. For use as the blend component, it is suitable to use butadiene rubber, ethylene-propylene rubber, styrene-butadiene rubber, polyethylene or the like as admixed with the polystyrene resin. For use as the copolymer component, it is suitable to use a monomer or an oligomer of butadiene, isoprene, chloroprene or the like as copolymerised with the polystyrene resin in a predetermined mole ratio. (It will be understood that when a copolymer is used as the polystyrene resin in this case, the copolymerized product containing the rubber is in the form of a terpolymer).

The rubber component serves to give flexibility to the sheet of polystyrene foam obtained. Although it is possible to prepare shaped articles according to the invention from a composition free from any rubber component, it is usually desirable to use the rubber component even if in a small amount. The composition contains the rubber component in an amount preferably of 0.3 to 15% by weight, more preferably 0.3 to 5.0% by weight, based on the polystyrene resin.

The polystyrene resin composition to be used in this invention may further incorporate therein such additives that will not affect the desired properties of the sheet of polystyrene foam to be prepared. Examples of useful additives are coloring agents, flame retardants, lubricants (such as hydrocarbons, fatty acids, fatty acid amides, esters, alcohols, metallic soaps, silicone oil, low-molecular-weight polyethylene and like waxes), extenders (such as liquid paraffin, polyethylene glycol, polybutene and the like), dispersants, etc. Some of such additives may of course be incorporated into the polystyrene resin when the resin is prepared.

Various volatile blowing agents and decomposable blowing agents are usable as blowing agents. Suitable volatile blowing agents include hydrocarbons boiling at about −40° C. to about 45° C., such as propane, butane and pentane, hydrocarbon halides boiling at about −47° C. to about 45° C., such as trichloromonofluoromethane, dichlorodifluoromethane and 1,2-dichlorotetrafluoroethane, and mixtures of these compounds. Suitable decomposable blowing agents include organic blowing agents, such as azodicarbonamide, dinitrosopentamethylenetetramine and 4,4'-hydroxybis(benzenesulfonylhydrazide), sodium bicarbonate, a combination of a bicarbonate and citric acid or like organic acid or salt of such an acid. (Such acid may have a coating of liquid paraffin or the like). Carbon dioxide, nitrogen gas and water are usable in some cases.

Although the quantity of the blowing agent to be used varies with the type of the agent, the blowing agent is used in such a quantity that the blowing agent will leave in the foamed sheet 0.03 to 0.3 mole/kg of a residual gas. For example, the volatile blowing agent is used in a quantity of about 0.03 to about 0.4 mole per kg of the polystyrene resin. (The agent is added usually in an extruder.) In the case of the decomposable type, about 0.1 to about 5 parts by weight of the blowing agent is used per 100 parts by weight of the polystyrene when the agent produces 3 to 30 cc of gas per 100 mg of the agent.

It is desirable to add a nucleating agent to the polystyrene resin composition for adjusting the "number of cell membranes widthwise" of the sheet of polystyrene foam according to the invention.

Examples or useful nucleating agents are talc, sodium hydrogencarbonate, ammonium hydrogencarbonate, calcium carbonate, clay, nitric acid, etc. The aforementioned decomposable blowing agents are also usable in a small amount. The amount of the nucleating agent for giving the desired number of cell membranes is dependent on the kind of the blowing agent to be used in combination therewith.

For example when talc is used as the nucleating agent in combination with butane or dichlorodifluoromethane serving as the blowing agent, about 0.05 to about 5.0% by weight, preferably about 0.3 to about 2.0% by weight, of talc is used based on the polystyrene resin. With the combination of talc and pentane, about 0.05 to about 5.0% by weight, preferably about 0.5 to about 2.5% by weight, of talc is used based on the resin. With the combination of talc and a decomposable blowing agent, the suitable amount of talc is about 0.01 to about 3.5% by weight based on the resin. When sodium bicarbonate and citric acid is used as the blowing agent, it is preferable to use about 0.5 to about 1.5% by weight of talc. When azodicarbonamide or like organic decomposable blowing agent is used, it is desirable to use about 0.04 to about 2.0% by weight of talc.

Known extruders are usable according to the invention. The die may be flat-shaped, T-shaped or circular provided that the die has a slit thickness of 0.15 to 0.6 mm in order to provide the desired thickness of polystyrene sheet.

The polystyrene resin composition is fed to the extruder through a hopper along with suitable additives, such as those already mentioned. When a volatile blowing agent is used, it is desirable to feed the blowing agent to the extruder separately from the resin composition and to mix them together within the extruder.

Within the extruder the polystyrene resin composition is at least melted by heating. At the same time, the composition is kneaded with the additives added as desired.

The foamed material of polystyrene extruded from the die of the extruder is cooled while being stretched uniaxially or biaxially into a sheet. When a circular die is used (in which case the extrudate is biaxially stretched), the cylindrical extrudate is cut, opened and made into a sheet.

The extruded material must be uniaxially or biaxially stretched to a draw ratio of up to 1.25 in view of the shapability or formability of the resulting sheet when the sheet is subsequently subjected to sheet forming (i.e., forming into the desired shape with heating).

Before the sheet forming, the foamed material extruded from the die and to be stretched into a sheet must be cooled to a surface temperature at least not higher than the softening point of the polystyrene resin. Preferably this temperature is up to 60° C., more preferably 20° C. to 50° C. Usually the foamed material is so cooled by the atmosphere immediately after extrusion from the die. When desired, the material is cooled rapidly by being brought into contact with a cooling plug (suitable for biaxially stretch) or cooling wall.

The time taken until the sheet is preheated (to a temperature not lower than the softening point of the sheet) for sheet forming after extrusion, although dependent on the output of the extruder, is usually 30 seconds to several minutes, for example, when a circular die is used in which case the extrudate is cut open. The distance from the die to the preheating unit is preferably about 8 to about 15 m.

This distance and the time taken for the transfer of the sheet from the die to the heating unit are variable in accordance with various factors, such as the thickness of the sheet and the sheet hauling speed. However, insofar as the sheet of polystyrene foam can be stabilized (by the above-mentioned cooling), the shortest possible time and distance are preferable to subject the sheet to the forming cycle quickly.

It will be understood that the above-mentioned time differs greatly from the duration of standing for aging in the conventional process. Ther term "without aging" or "substantially without aging" as used for the process of the invention does not include a prolonged period of time conventionally used, e.g. 1 to 2 weeks but includes up to about several minutes. In some cases, however, the term icludes up to several hours. The term "several hours" refers, for example, to a case in which a sheet produced on a certain day is subjected to sheet forming on the following day after an intermission. Even in such a case, the standing of the sheet produces substantially no influence on the shaped product finally obtained.

According to the invention, the quantity of residual gas in the sheet obtained by extrusion foaming is controlled to 0.03 to 0.3 mole/kg. The amount of gas can be substantially so controlled by adjusting the amount of the blowing agent, but if the sheet prepared by extrusion foaming contains an amount of residual gas exceeding the above range, the amount of gas may be controlled by increasing the hauling distance for the release of gas or providing a zone in which the foamed sheet being hauled off is heated to 40° C. to 50° C. for releasing the gas.

Immediately after extrusion, the sheet of polystyrene foam starts to release the blowing agent from the interior of its pores to the atmosphere while permitting inflow of air into the pores. Besides, when the quantity of residual gas exceeds 0.3 mole/kg as is the case with conventional sheets, the blowing agent is easily releasable and produces a reduced pressure within the pores, consequently taking a longer period of time for the replacement by air and giving rise to the necessity of aging for a prolonged period of time as already described to render the sheet properly shapable in the subsequent step. However, if the quantity of residual gas is up to 0.3 mol/kg as specified, the pores contain a stabilized quantity of the blowing agent, allowing release of a very small amount of the blowing agent when air flows into the pores. Accordingly it is believed that no vacuum will be produced in the interior of the pores, rendering the sheet properly formable with heating immediately after extrusion.

Thus we have surprisingly found that the adjustment of the amount of gas remaining in the sheet makes it possible to produce shaped articles from the sheet by a continuous process without substantial aging.

According to the present invention, the sheet of polystyrene foam resulting from the foregoing steps has a low expansion ratio of 1.5 to 7.0 which corresponds to a bulk density of 0.15 to 0.7 g/m$^3$. If the expansion ratio is less than 1.5, the process requires an increased quantity of resin and a larger quantity of heat for the subsequent thermoforming step to prolong the forming cycle. On the other hand, if the expansion ratio is higher than 7.0, the sheet will have reduced strength and can not be made into shaped articles of small wall thickness. The expansion ratio is adjusted chiefly by varying the quantity of the blowing agent used.

To obtain shaped articles having a wall thickness of about 0.3 to about 1.7 mm by vacuum forming, press forming or like forming step, it is suitable that the sheet of polystyrene foam be 0.3 to 1.0 mm in thickness. The thickness of the sheet is easily so controllable by extruding the resin composition from a die having a slit thickness of 0.15 to 0.6 mm at a suitable speed as already described.

The sheet of polystyrene foam is 5 to 20 in the number of cell membranes widthwise of the sheet. The term "the number of cell membranes widthwise of the sheet" means the number of the cell membranes exclusive of the opposite surface layers and as arranged widthwise of the sheet in a section thereof formed when the sheet is cut widthwise. If the number is less than 5, the cellular structure has not developed satisfactorily widthwise of the sheet, failing to give proper strength to the sheet. Conversely when the sheet has too small a cell membrane number, the membranes have a reduced thickness, rendering the sheet excessively flexible. As already described, the number of cell membranes is adjusted chiefly by varying the amount of nucleating agent used.

The sheet of polystyrene foam thus prepared can be immediately subjected to a forming step without being allowed to stand for aging. For this procedure, the sheet is heated to a temperature not lower than the softening point of the sheet, fed to forming molds and formed. The resulting sheet is suitably cut and trimmed, whereby shaped articles of polystyrene foam are obtained with the desired wall thickness.

The shaped product of polystyrene foam of this invention may be one having a film of unfoamed thermoplastic resin coating on at least on surface thereof. Such a product is especially preferable when the sheet is prepared from a polystyrene resin composition containing only a small quantity of rubber or free from any rubber since the film coating gives enhanced mechanical strength to the product. Further the necessity for film coating may arise to give sealing properties to the shaped product.

Examples of resins useful for the thermoplastic resin film are generally those capable of forming a sheet, such as polystyrene, plyethylene, a mixture or copolymer of polystyrene and a rubber, namely high impact polystyrene, polypropylene, polyethylene terephthalate, etc., of which polystyrene, high-density polyethylene and high impact polystyrene are preferable in view of shapability. Of these, polystyrene and high impact polystyrene are more preferable in view of ease of handling. The film may be stretched to some extent.

The thermoplastic resin film may be laminated to the sheet of polystyrene foam within the die of an extruder, using a confluent die (such as cross head die) or causing the thermoplastic resin to flow into the die at a location upstream from the die slit for lamination. When the film is to be laminated to the sheet of polystyrene foam after the extrusion of the sheet, an extruder and a haul-off unit may be provided in combination for the film, such that the film extruded in continuously laminated to the sheet. The film of thermoplastic resin which is prepared in advance may be used to laminate it to the sheet of polystyrene foam by a suitable method. Furthermore, the lamination as mentioned above may be conducted by thermal fusion or by use of an adhesive.

The thermoplastic resin film has a suitable thickness so as not to entail any trouble during the forming operation. The preferred thickness is usually about 5 to about 300 μm although variable with the kind of resin used.

The composite sheet, when subjected to the same thermoforming step as already described, affords shaped articles of polystyrene foam having the desired thickness.

Embodiments of the continuous production process of the present invention will be described in detail with reference to the accompanying drawings.

With reference to FIG. 1, a polystyrene resin composition (granular) containing, for example, about 10% by weight of a rubber as a blend component is fed from a hopper 1 to an extruder 2, in which the composition is melted and kneaded with a volatile blowing agent which is supplied from a control feeder 3a via feeder duct 3. The composition is foamed and extruded into a cylindrical form from a circular die 4 having a slit thickness of 0.15 to 0.6 mm and a temperature of about 110° C. while being streched biaxially. The cylindrical foamed material 5 extruded is cooled to a temperature below the softening point thereof by the atmosphere and a cooling plug 6, continuously cut and opened into a sheet form by a cutter knife 7 and continuously pulled along by a haul-off unit 8 having rolls 8a and stage rolls 8b arranged in different stages. The foamed material in the form of a sheet is further cooled almost to room temperature by being passed through the haul-off unit 8 and made into a sheet 9 of polystyrene foam having a bulk density of 0.15 to 0.7 g/cm$^3$, a thickness of 0.3 to 1.0 mm, 5 to 20 cell membranes widthwise of the sheet and a draw ratio of up to 1.25 and containing 0.03 to 0.3 mole/kg of the residual gas of the blowing agent. The sheet 9 is sent by a feed chain 11 into a preheating unit 10 having upper and lower heaters 10a, heated to a temperature not lower than the softening point of the sheet and subsequently subjected to sheet forming in a press forming unit 12 including a multiplicity of the desired forming molds 12a. The resulting assembly 15 of shaped articles of polystyrene foam was cut by a cutter 13 every forming cycle. The cut pieces are sent forward on a conveyor 14. The shaped articles are thereafter separated individually and trimmed suitably, whereby the desired shaped articles of polystyrene foam are obtained. Since the forming cycle is repeated intermittently, the feed of the sheet is adjusted by the stage rolls 8b. When the press forming unit 12 is replaced by a rotary unit, the sheet can be formed continuously without the necessity of adjustment by the stage rolls 8b. Besides, when a roll for stocking the sheet is set on e.g., between the haul-off unit 8 and the preheating unit 11, it would be not required to stop the operation of the extruder 2, even if there occures a case to stop the operation of the press forming unit 12.

Figure 2:
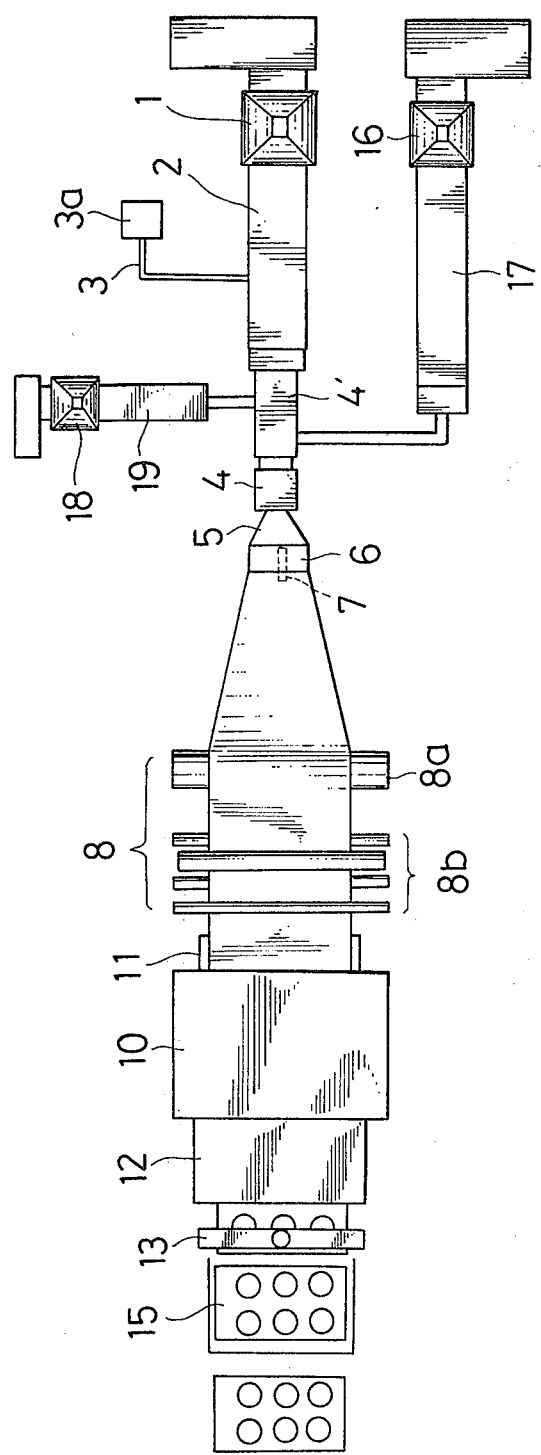
FIG. 2 is a plan view schematically showing the main arrangement of an apparatus for continuously producing shaped articles of thermoplastic film laminated polystyrene foam.

FIG. 2 shows another apparatus wherein an adhesive extruder 19 is connected to a thermoplastic resin extruder 17 by a cross head die 4' to coat a melt of polystyrene resin composition with a thermoplastic resin film within the die. Numeral 16 and 18 each denotes hopper. The resulting laminate is thereafter treated in the same manner as above, whereby shaped articles of polystyrene foam having the film laminated thereto are continuously obtained according to the invention.

With the continuous production process of the invention described above, preheating of the polystyrene foam sheet for making its shaped article may be a period during about 1 to 14 seconds. This permits a veriable choice of preheating time as well as a shorter minimized period of time, in comparison with conventional processes which required about 4 to 10 seconds preheating for polystyrene foam sheets and also about 10 to 15 seconds for unfoamed polystyrene sheets.

The present invention will be described in greater detail with reference to the following examples to clarify the advantages of the invention.

EXAMPLE 1

The same apparatus as shown in FIG. 1 was used for producing shaped articles.

Figure 3:
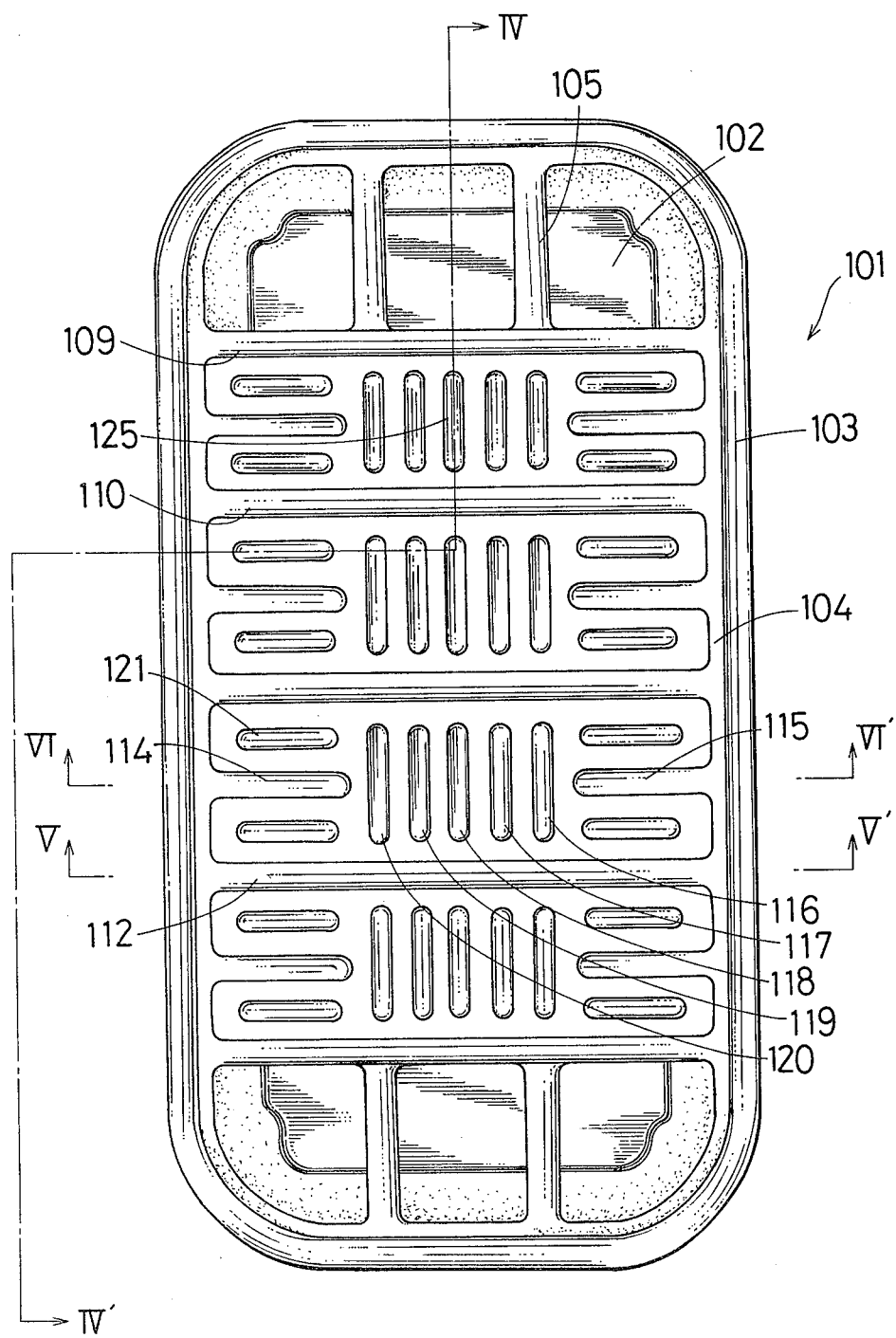
FIG. 3 is a plan view showing a tray exemplary of shaped articles of polystyrene foam obtained by the process of the invention.
Figure 4:
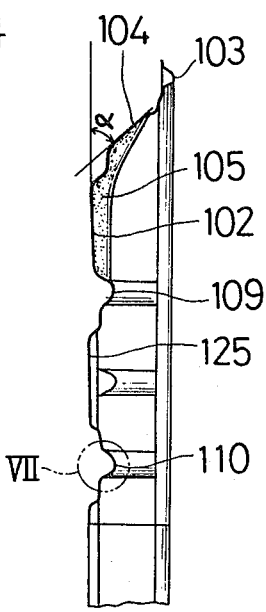
FIG. 4 is a fragmentary view in section taken along the line IV-IV' in FIG. 3.
Figure 5:
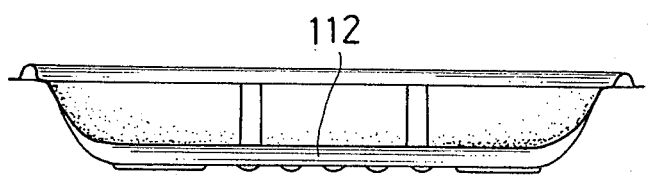
FIG. 5 is a view in section taken along the line V-V' in FIG. 3.
Figure 6:
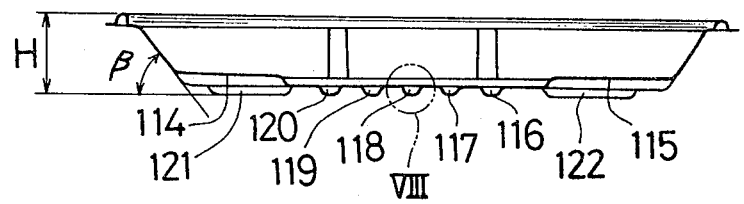
FIG. 6 is a view in section taken along the line VI-VI' in FIG. 3.
Figure 7:
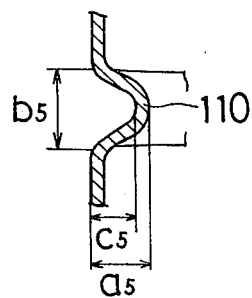
FIG. 7 is an enlarged view showing the portion VII in FIG. 4.
Figure 8:
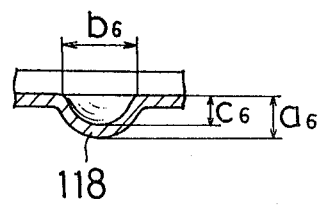
FIG. 8 is an enlarged view showing the portion VIII in FIG. 6.

Ninety-five parts by weight of polystyrene, (Styron 691; Asahi-Dow Ltd., Japan), 5 parts by weight of polystyrene containing 10% by weight of butadiene rubber (Denka Styrol HIU-1: Denki Kagaku Kogyo K.K.) 1.2 parts by weight of talc and 0.1 part by weight of liquid paraffin were uniformly mixed together by a tumbler to obtain a mixture. The mixture was fed from a hopper to an extruder having a screw diameter of 90 mm, heated at about 200° C. for melting and kneaded with butane serving as a blowing agent and forced into the extruder at a rate of 0.27 mole/kg of the mixture. The molten mixture was extruded and foamed at a rate of 85 to 90 kg/hr. from a circular die attached to the forward end of the extruder and having a slit clearance of 0.35 mm and a temperature of 110° C. The cylindrical foamed material obtained was subsequently passed through a cooling plug and thereby cooled to about 82° C. while being stretched to a draw ratio of 1.15 longitudinally of the cylinder and to a draw ratio of 1.2 widthwise thereof. The cylindrical material was then cut and opened by a cutter into a sheet, which was pulled along by a haul-off unit having stage rolls (including two rolls 20 mm in diameter and one roll 30 mm in diameter) and two haul-off rolls (320 mm in diameter). In the meantime, the sheet was cooled to a surface temperature of about 40° C. Sugsequently the sheet was sent by a feed chain into a sheet, which was pulled along by a haul-off unit having stage rolls (including two rolls 20 mm in diameter and one roll 30 mm in diameter) and two haul-off rolls (320 mm in diameter). In the meantime, the sheet was cooled to a surface temperature of about 40° C. Subsequently the sheet was sent by a feed chain into a preheating chamber having infrared heaters heated to about 430° C. and was thereby heated to a temperature of at least 110° C. The sheet was then fed to press molds for making 36 (4×9) trays, pressed at pressure of 1.5 tons for 6.4 seconds for sheet forming and cut by a cutter into forming units, which were separated into individual trays as shown in FIG. 3. Referring to FIG. 3, numeral 101 denotes tray, numeral 102 denotes bottom wall, numeral 103 denotes brim, numeral 104 denotes peripheral side wall and numeral 105, 109, 110, 112, 114–122 and 125 each denotes rib.

Before the sheet forming, the sheet of polystyrene foam had a bulk density of 0.61 g/cm$^3$, a thickness of 0.8 mm, 12 cell membranes widthwise of the sheet, draw ratios of 1.15 longitudinally and 1.2 widthwise and a weight of 120 g/m$^2$ and contained about 0.2 mole/kg of residual gas.

Table 1 shows specifications of the tray (ribbed) thus prepared and those of conventional trays (ribbed).

TABLE 1

|  | Tray of invention | Conventional tray of foam | Conventional tray of unfoamed sheet |
| --- | --- | --- | --- |
| Wall thickness (mm) | 0.8 | 3.0 | 0.3 |
| Weight (g) | 3.0 | 3.0 | 6.0 |
| Nerve (g) | 270 | 350 | 278 |
| Stack height (mm) | 365 | 600 | 270 |
| Resistance to cracking | Medium | High | Low |
| Preheating time for forming (sec) | 6.1 | 9.5 | 15 |

The other specifications of the tray of this invention are as follows.
1. Material: polystyrene foam
   Rubber content: 0.5%
   Expansion ratio: 6.1
2. Shape: See FIGS. 3 to 8
3. Dimensions:
   (1) Length: 195 mm
       Width: 103 mm
       Height (H): 19 mm
       Angle of inclination of peripheral side wall:
       $\alpha, \beta = 75$ deg.
   (2) Rib 110: 3 mm in height a5, 1 mm in groove width b5, 0.5 mm in groove depth c5
   (3) Rib 118: 1 mm in height a6, 3 mm in groove width b6, 0.5 mm in groove depth c6.

The shaped article prepared by Example 1 is comparable in structural strength to the conventional shaped article of unfoamed polystyrene sheet as will be apparent from above. The product of the invention is inferior to the conventional product prepared from foamed polystyrene sheet but is smaller in wall thickness and therefore exceedingly smaller in stack height than the conventional product of polystyrene foam.

In respect of shapability including resistance to cracking during forming, the product of the invention is slightly inferior to the conventional product of polystyrene foam but is superior to the conventional product of unfoamed polystyrene.

When evaluated from an overall viewpoint, the tray or like shaped product obtained by the process of the invention is most economical.

Trays (ribbed) were prepared with use of the same apparatus as used in Example 1 under various conditions. For illustrative purposes, Table 2 shows the properties and compositions of sheets of polystyrene foam which achieved satisfactory results along with those of sheets prepared for comparison.

TABLE 2

|  | Ex. 1 | Ex. 2 | Ex. 3 | Ex. 4 | Ex. 5 |
| --- | --- | --- | --- | --- | --- |
| Composition (parts by wt.) |  |  |  |  |  |
| Polystyrene resin | 95 (Styron 691) | 95 (Styron 686) | 75 (Polystyrene MS-200; SEKISUI KASEIHIN KOGYO K. K., Japan) | 70 (Polystyrene MS-620) | 100 (Styron 666) |
| Polystyrene with K % of butadiene as copolymer component | K = 10 5 parts (Denka Styrol HIU-1) | K = 6 5 parts (Denka Styrol HIR-5) | K = 6 25 parts (Denka Styrol HIR-5) | K = 60 30 parts (Tufpren; Asahi Dow Co., Ltd.) | 0 |
| Nucleating agent | Talc, 1.2 for all Examples |  |  |  |  |
| Extender | Liquid paraffin, 0.1 for all Examples |  |  |  |  |
| Blowing agent (mole/kg) | Butane 0.27 | Butane 0.18 | Dichlorodifluoromethane 0.25 | Butane 0.18 | Butane 0.18 |
| Rubber content (wt. %) | 0.5 | 0.3 | 1.5 | 18 | 0 |
| Bulk Density (g/cm$^3$) | 0.17 | 0.27 | 0.20 | 0.36 | 0.27 |
| Thickness (mm) | 0.8 | 0.6 | 0.6 | 0.5 | 0.6 |
| Residual gas after cooling on extrusion (mole/kg) | 0.20 | 0.14 | 0.16 | 0.14 | 0.14 |
| Weight (g/m$^2$) | 120 | 160 | 120 | 180 | 160 |
| Note |  |  |  |  | 1 |

|  | Comp. Ex. 1 | Comp. Ex. 2 | Comp. Ex. 3 | Comp. Ex. 4 |
| --- | --- | --- | --- | --- |
| Composition (parts by wt.) |  |  |  |  |
| Polystyrene resin | 100 (Styron 683) | 100 (Styron 683) | 95 (Styron 686) | 95 (Styron 686) |
| Polystyrene with k % of butadiene as copolymer component | 0 | 0 | K = 10 5 parts (Denka Styrol HIU-1) | K = 6 5 parts (Denka Styrol HIU-1) |
| Nucleating agent | Talc, 1.2 for all Comp. Ex. |  |  |  |
| Extender | Liquid paraffin, 0.1 for all Comp. Ex. |  |  |  |
| Blowing agent (mole/kg) | Butane 0.70 | Butane 0.65 | Butane 0.40 | Butane 0.03 |
| Rubber content (wt. %) | 0 | 0 | 0.5 | 0.3 |
| Bulk density (g/cm$^3$) | 0.079 | 0.09 | 0.12 | 0.75 |
| Thickness (mm) | 2.3 | 1.2 | 0.9 | 0.35 |
| Residual gas after cooling on extrusion (mole/kg) | 0.42 | 0.39 | 0.35 | 0.02 |
| Weight (g/m$^2$) | 180 | 115 | 106 | 263 |

TABLE 2-continued

| Note | 2 | 2 | 2 | 3 |
|---|---|---|---|---|

Note
[1] The tray obtained with its length crossing the longitudinal direction of the sheet is susceptible to cracking. However, the tray formed with its length oriented longitudinally of the sheet is fully resistant to cracking.
[2] The tray is prone to cracking irrespective of the orientation thereof relative to the sheet. The forming cycle, which involves reduced freedom, is not amenable to continuous operation. The sheet is not effectively formable due to improper stretching. The blowing agent acts as a solvent to break down some cells and result in low strength. The product has a molten portion in its surface.
[3] The forming cycle involves reduced freedom and is not suited to continuous operation. An increased amount of heat needed for preheating leads to a reduced efficiency.

EXAMPLE 6

Shaped articles were produced with use of the same apparatus as shown in FIG. 2, including an extruder (indicated at 2 in FIG. 2) having a screw diameter of 90 mm and equipped with an extruder (indicated at 19 in FIG. 2) for an adhesive (a mixture of butadiene-styrene resin and low-density polyethylene) and with an extruder (indicated at 17 in FIG. 2) for high-density polyethylene. Ninety parts by weight of polystyrene (Styron 666; Asahi-Dow Co., Ltd.) and 10 parts by weight of polystyrene containing 6% by weight of butadiene rubber as a copolymer component (Idemitsu Styrol HI50; Idemitsu petrochemical Industries Co., Ltd.), were uniformly mixed together in a tumbler to obtain a mixture. The mixture was melted and kneaded with a blowing agent, dichlorodifluoromethane, in a quantity of 0.15 mole per kg of the mixture in an extruder 2. The mixture, the adhesive and the high-density polyethylene were passed through a cross head die and extruded, upon foaming, from a circular die having a slit clearance of 0.45 mm and a temperature of 120° C., then passed through a cooling tube having a diameter of 331 mm and pulled along in the same manner as in Example 1 while being cooled to a surface temperature of about 45° C., whereby a sheet of polystyrene foam was obtained which had a high-density polyethylene film laminated to its one surface with the adhesive.

In the same manner as in Example 1, the sheet was heated, without aging, to a temperature not lower than the softening point of the polystyrene foam in a heating chamber equipped with infrared heaters at 430° C. The sheet was then pressed by molds at pressure of 1.5 tones for 12 seconds, affording the desired trays measuring 190 mm × 97 mm × 15 mm as same as in FIG. 3.

Shaped articles of polystyrene foam having a film laminated thereto were similarly prepared continuously under varying conditions in Examples 7 to 9. For comparison, shaped articles were prepared without lamination in Example 10. Table 3 shows the results achieved in Examples 6 to 10.

The shaped articles of laminate thus prepared are small in stack height and have higher mechanical strength than those prepared without lamination, appear attractive as a commercial product and are useful as containers, trays and partitioned sheets. Further with use of a suitably selected film, shaped articles can be prepared which have controlled permeability to moisture or gas and which are especially useful for packaging foods. The process described above has another advantage in that containers can be prepared with ease by deep drawing.

| | | Ex. 6 | Ex. 7 | Ex. 8 | Ex. 9 | Ex. 10 |
|---|---|---|---|---|---|---|
| | Conditions | High-density polyethylene film laminated to sheet of polystyrene foam (within die) | High-impact Polystyrene film laminated to sheet of polystyrene foam (within die) | High-impact polystyrene film laminated to sheet of polystyrene foam (film thermally adhered to sheet separately prepared) | Same as in Example 8 | Sheet of polystyrene foam alone |
| Formulation (weight parts) | Polystyrene sheet | | | | | |
| | Polystyrene | 90 (Styron 666) | 90 (Styron 685) | 90 (Styron 686) | 75 (Polystyrene MS-620) | 95 (Polystyrene MS-620) |
| | Butadiene, K % | K = 6 10 parts (Idemitsu Styrol HI 50) | K = 6 10 parts (Idemitsu Styrol HI 50) | K = 6 10 parts (Asafrex TPO 11, Asahi Chemical Ind. Co., Ltd., Japan | K = 6 25 parts (Asafrex TPO 11) | K = 6 5 parts (Idemitsu Styrol HI 50) |
| | Nucleating agent | talc 1.2 | talc, 1.2 | talc, 1.2 | talc, 1.2 | talc, 1.2 |
| | Extender | Liquid paraffin, 0.1 | Liquid paraffin, 0.1 | Liquid paraffin, 0.1 | Liquid paraffin, 0.1 | Liquid paraffin, 0.1 |
| | Blowing agent (mole/kg) | 0.15 | 0.15 | 0.15 | 0.21 | 0.18 |
| | Film | | | | | |
| | Thermoplastic resin | 100 | 50 | 40 | 40 | — |
| | Butadiene, K % | — | K = 6, 50 parts | K = 6, 60 parts | K = 6, 60 parts | — |
| | Adhesive | Butadiene-styrene + low-density polyethylene, 8 | — | — | — | — |
| | Properties of polystyrene sheet (after cooling) | | | | | |
| | Foam sheet | | | | | |
| | Thickness (mm) | 0.9 | 0.92 | 0.85 | 0.75 | 0.6 |
| | Bulk density (g/cm³) | 0.34 | 0.33 | 0.33 | 0.24 | 0.27 |
| | Film thickness (μ) | 80 | 80 | 110 | 110 | — |
| | Combined weight (g/cm²) | 407 | 389 | 400 | 300 | 160 |
| | Residual gas after | 0.08 | 0.08 | 0.05 | 0.06 | 0.14 |

| -continued | Ex. 6 | Ex. 7 | Ex. 8 | Ex. 9 | Ex. 10 |
|---|---|---|---|---|---|
| extrusion (mole/kg) | | | | | |
| Properties of tray | | | | | |
| Wall thickness (mm) | 1.0 | 1.0 | 0.95 | 0.85 | 0.6 |
| Weight (g) | 7.5 | 7.1 | 7.5 | 5.6 | 2.9 |
| Nerve (g) | 315 | 325 | 325 | 305 | 235 |
| Stack height (mm) | 410 | 415 | 395 | 375 | 325 |
| Resistance to cracking | Height | Height | Height | Height | medium |
| Forming cycle (sec) | 12 | 11 | 13 | 10 | 5.5 |

What we claim is:

1. A process for continuously producing shaped articles of polystyrene foam characterized by extruding a polystyrene resin composition which contains 0 to 20% by weight of a rubber as a blend or copolymer component based on the polystyrene resin from the die of an extruder along with a blowing agent to prepare a foamed material, cooling the foamed sheet material to a surface temperature at least not higher than a softening point of the polystyrene resin while stretching the material uniaxially or biaxially to obtain a sheet of polystyrene foam having a bulk density of 0.15 to 0.7 g/cm$^3$, a thickness of 0.3 to 1.0 mm, 5 to 20 cell membranes widthwise of the sheet and a draw ratio of up to 1.25 and containing 0.03 to 0.3 mole/kg of the residual gas of the blowing agent, and subsequently thermoforming the resulting sheet into the desired shape with heating substantially without aging the sheet.

2. The process of claim 1 in which the polystyrene resin in the polystyrene resin composition is a polymer of a styrene vinyl monomer, such as styrene, methylstyrene or dimethylstyrene, or a copolymer of such a monomer and another vinyl monomer, such as acrylic acid, methacrylic acid, and ester of such an acid, acrylonitrile, acrylamide, methacrylnitrile or maleic anhydride, which have a weight average molecular weight of about $5 \times 10^4$ to about $70 \times 10^4$ as determined by the Gel Permeation Chromatograph (GPC) method.

3. The process of claim 1 in which the rubber as a blend is butadiene, ethylene-propylene, styrene-butadiene or polyethylene rubber.

4. The process of claim 1 in which the rubber as a copolymer component is butadiene, isoprene or chloroprene.

5. The process of claim 1 in which the polystyrene resin composition contains 0.1–15% by weight of a rubber.

6. The process of claim 1 or 3 in which said composition contains 0.3–5% by weight of a rubber.

7. The process of claim 1 in which the blowing agent is a volatile blowing agent such as propane, butane, pentane, trichloromonofluoromethane, dichlorodifluoromethane or 1,2-dichlorotetrafluoroethane, or mixture thereof and is used in a quantity of 0.03 to 0.4 mole per Kg of the polystyrene resin in the polystyrene resin composition.

8. The process of claim 1 in which the polystyrene resin composition contain a nucleating agent such as talc, sodium hydrogencarbonate, ammonium hydrogencarbonate, calcium carbonate, clay or citric acid.

9. The process of claim 1 in which the die has a slit thickness of 0.15 to 0.6 mm.

10. The process of claim 1 in which a thermoplastic resin film is further laminated to at least one surface of the foamed material to be formed within the die of an extruder or laminated to at least one surface of the foamed material extruded from the die, to obtain a composite sheet.

11. The process of claim 10 in which a confluent die such as cross head die is used.

12. The process of claim 11 in which the resin for the thermoplastic resin film is polystyrene, high-density polyethylene or high impact polystyrene.

* * * * *